United States Patent
Dzuban et al.

(10) Patent No.: US 7,050,454 B1
(45) Date of Patent: May 23, 2006

(54) METHOD AND COMMUNICATION NETWORK FOR THE ADMINISTRATION OF ADDITIONAL SERVICES

(75) Inventors: Stanislav Dzuban, Österreich (AT); Manfred Leitgeb, Gramatneusiedl (AT)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/403,665

(22) PCT Filed: Apr. 17, 1998

(86) PCT No.: PCT/DE98/01079

§ 371 (c)(1),
(2), (4) Date: Oct. 25, 1999

(87) PCT Pub. No.: WO98/49841

PCT Pub. Date: Nov. 5, 1998

(30) Foreign Application Priority Data

Apr. 25, 1997 (DE) ................................ 197 17 588

(51) Int. Cl.
*H04J 3/16* (2006.01)
(52) U.S. Cl. ...................... 370/466; 370/420; 370/522; 370/410
(58) Field of Classification Search ................ 455/433, 455/448, 461, 517; 370/419–420, 463, 522, 370/524, 410, 466
See application file for complete search history.

(56) References Cited

U.S. PATENT DOCUMENTS

| | | | | |
|---|---|---|---|---|
| 5,504,804 A | | 4/1996 | Widmark et al. .......... 455/63.2 |
| 5,920,820 A | * | 7/1999 | Qureshi et al. ............. 455/461 |
| 5,966,653 A | * | 10/1999 | Joensuu et al. ............. 455/445 |
| 6,044,263 A | * | 3/2000 | Valentine et al. ........ 455/414.1 |
| 6,044,274 A | * | 3/2000 | Vo et al. ..................... 455/461 |
| 6,085,105 A | * | 7/2000 | Becher ....................... 455/517 |
| 6,134,433 A | * | 10/2000 | Joong et al. ................ 455/417 |
| 6,181,927 B1 | * | 1/2001 | Welling, Jr. et al. ........ 455/414 |

FOREIGN PATENT DOCUMENTS

| | | |
|---|---|---|
| EP | 0 715 473 A2 | 6/1996 |
| WO | WO 96.20572 | 7/1996 |

OTHER PUBLICATIONS

Haran, Deploying IN Services in a Mobile Environment, Operations and Quality Control, p. 1043-1049.*
Global system for mobile communications what's in store? Holley, pp. 48-54.

* cited by examiner

*Primary Examiner*—Chi Pham
*Assistant Examiner*—Ronald Abelson
(74) *Attorney, Agent, or Firm*—Bell, Boyd & Lloyd LLC

(57) ABSTRACT

A method and communication network for administering additional services which provides that a subscriber self-input into communication terminal equipment be initiated by the subscriber for the respective additional service and, due to the subscriber self-input at least one structured container message is generated by the communication terminal equipment and is sent to a memory unit of the communication network. The container message received by the memory unit is inventively forwarded via an interface that connects the memory unit to the service control point. The interface implemented between memory unit and service control point makes it possible that the container message can be forwarded up to the service control point for a service handling via the subscriber self-input for the additional service.

13 Claims, 2 Drawing Sheets

CB: 150 ... 199
TB: 174 ... 199

METHOD AND COMMUNICATION NETWORK FOR THE ADMINISTRATION OF ADDITIONAL SERVICES

BACKGROUND OF THE INVENTION

The present invention is directed to a method and communication network for the administration of additional services in such communication network, as well as to a service control point configured for the method, wherein the additional services can be utilized in conformity with an intelligent network structure.

DESCRIPTION OF THE PRIOR ART

Communication networks are configured, for example, either as fixed networks or as mobile communication systems such as the known GSM mobile radio telephone network (Global System for Mobile communications) and include switching equipment networked with one another. In mobile radio telephone networks, respective base stations are connected to the switching equipment, and communication terminal equipment is connectable by these via an air interface. This communication terminal equipment, referred to as mobile stations, enable network access for a mobile subscriber of the communication system. Over and above this, the switching equipment effects the transition to other networks, such as data transmission networks, or to a fixed network.

It is also known from the GSM mobile radio telephone network to employ memory units in which subscriber-associated data for the in-network services are respectively stored. One of these memory units is the home register that is usually located at a permanently defined location and wherein the data underlying the registration of the subscriber is deposited. The data also includes the services that the subscriber can use. The subscribers can control the service data by subscriber self-inputs into the mobile station; i.e., modify them as well. Subscriber self-input operations (—basic MMI (man-machine interface) functions and MMI procedures—) are possible for the standardized GSM services. These effect a dialog with the home register at the beginning/end of a connection. A permanently defined function protocol with standardized content is employed for this purpose. The subscriber self-input during a connection also is fundamentally possible. For signaling non-GSM-standardized services in the mobile radio telephone network, as known, unstructured auxiliary services operations can sequence on the basis of USSD container messages (unstructured supplementary service data) that sequence between the mobile station and a network of the mobile radio telephone network. The existing USDD-MMI operation exhibits a defined character set.

GSM mobile stations automatically distinguish between the subscriber self-inputs for standardized services and all other inputs, and then use corresponding protocols for the data transmission. Thus, all inputs that the mobile station does not recognize as telephone number or as standardized subscriber self-input are transmitted to the mobile radio telephone network as USDD contain messages.

A switch is being made to service control with intelligent network structures for an optimally flexible introduction, expansion and use of new services. Service control points dependent on the transport network, (for example, the mobile radio telephone network in an intelligent network) respectively contain control functions (service control function) for sequencing the services and data functions (service data function) for offering the data needed for the services. EP 0 715 473 A2 discloses that the services useable in an intelligent network are initiated in a service switching point in order to effect an exit from the standard call processing and, thus, in order to activate an access to additional services in the framework of a call connection. Such service switching points can be realized in the switching equipment or as separate devices. A service identifier is thereby stored as subscriber-individual subscriber datum in the respective subscriber data base and a branch to a service control point of the intelligent network is triggered by evaluating this service identifier only during the call handling given an incoming or outgoing call.

In addition to the services according to the intelligent network structure that also can be used by subscribers of fixed networks, what is referred to as a CAMEL (Customized Application for Mobile Network Enhanced Logic) platform is known specifically for mobile radio telephone networks, the support of additional vendor-specific services for mobile subscribers to be enabled therewith. An operator-specific, additional service also can be used across network and service boundaries of a communication network. The control function and data function for service handling are likewise realized in a service control point (CAMEL service environment).

International Patent Application WO 96/20572 discloses a cellularly constructed mobile radiotelephone network according to the GSM standard that, in particular, disclose the control of an interactive communication between a mobile telephone or, respectively, mobile subscriber of the mobile radiotelephone network and devices (TTEN) outside the network, these making a standard announcement service or a standard fax service available in the example. For the control of the interaction, USSD messages are transmitted from the MS to the network and are interpreted at the network side by the home register as to whether an HLR application or a TTEN application is requested and is to be implemented. In the later instance, an additional network means (the transfer means (TTU)) is introduced into the interaction, this being additionally provided in the network as a separate control device for handling all TTEN applications. As the applicable, separate network means, the TTU selects the devices outside the network that are respectively suitable for handling the TTEN applications.

An object of the present invention is to make it possible for subscribers of a communication network to be able to access additional IN services with optimally little outlay and transparently for the communication network.

SUMMARY OF THE INVENTION

Accordingly, pursuant to an embodiment of the present invention, a subscriber self-input into the communication terminal equipment is initiated by the subscriber for an additional service, and on the basis of the subscriber self-input, at least one structured container message is generated by the communication terminal equipment and is sent to the memory unit. For using additional services controllable by a service control point according to an intelligent network structure, the implementation of an interface inventively occurs directly between the memory unit and the service control point so that the received container message, after interpretation of the content thereof, is transmitted directly to the service control point according to an interface protocol.

The interface implemented between memory unit and service control point makes it possible that the container message or messages can be passed through up to the service control point via the subscriber self-input for the additional service. As a result thereof, a simple service handling (for example, for inquiry, expansion and/or modification of service data of the respective service, etc.) is uniformly possible for all additional services according to the intelligent network structure proceeding from the subscriber self-input. The structured container message for the selection of the additional service is known, on the one hand, to the communication device and, on the other hand, to the service control point and is, thus, transported transparently through the communication network.

An object of the invention is to make it possible for subscribers of a communication network who wish to use additional services controllable by a service control point according to an intelligent network structure to be able to access the additional services with optimally little outlay and transparently for the communication network.

This object is inventively achieved by the features of patent claim 1 in view of the method, by a service control unit comprising the features of patent claim 13 and by a communication network comprising the features of patent claim 12. Advantageous developments of the invention can be derived from the subclaims.

The method for administering additional services provides that a subscriber self-input into the communication terminal equipment is initiated by the subscriber for the respective, additional service, and at least one structured container message is generated by the communication terminal equipment on the basis of the subscriber self-input and is sent to the memory unit. The container message received by the memory unit is subsequently inventively forwarded to the service control point via an interface that connects the memory unit to the service control point.

The interface implemented between memory unit and service control point makes it possible that the container message or messages can be passed through up to the service control point via the subscriber self-input for the additional service. As a result thereof, a simple service handling—for example, for inquiry, expansion and/or modification of service data of the respective service, etc.—is uniformly possible for all additional services according to the intelligent network structure proceeding from the subscriber self-input. The structured container message for the selection of the additional service is known, on the one hand, to the communication device and, on the other hand, to the service control point and is thus transported transparently through the communication network.

As a result of the subject matter of the present invention, there is also the possibility of selecting operator-specific services according to phase 1 of the CAMEL platform for a service handling in the service control point in order, for example, to modify the service data of the additional service. An application of the inventive method in a mobile radio telephone network effects that the container message-due to the subscriber self-input—is always automatically routed to a home register and is forwarded therefrom to the service control point. As a result thereof, any and all specific support of the auxiliary services is superfluous in a visitor mobile radio telephone network deviating from the home mobile radio telephone network and in whose coverage area the subscriber moves. This means that all services that only require the functionality of the CAMEL phase 1 for the service control and that only need the administration via the subscriber self-input according to the present invention from the CAMEL phase 2 also can be offered in other visitor mobile radio telephone networks, by the network operators, with only a CAMEL phase 1 service support. In this way, the request of a complete service support of CAMEL phase 2 can be limited.

In conformity with an embodiment of the present invention, a service code is co-transmitted in the structured container message and is interpreted by the memory unit before, dependent on the result of the interpretation, before the container message is forwarded to the service control point. In a simple way, thus, whether or not it is a matter of an additional service that, according to the present invention for service control, is to be forwarded to the service control point can be individually identified in the message for every service. Advantageously, the interpretation ensues by a comparison of the service code to service codes of a service code area with which the additional services controllable by the service control point are identified. Given coincidence of the service code with one of the service codes of the service code area, the container message is then forwarded to the service control point.

According to an advantageous development of the invention, at least one sub-area of a service code area used for the selection of the memory unit is reserved as service code area for the additional services controllable by the service control point. A division of the service control between memory unit and service control point thus occurs such that only the messages generated on the basis of the subscriber self-inputs that contain a service code lying within the reserved service code area are forwarded for processing in the service control point. This yields the advantage of reducing the signaling load on the interface between memory unit and service control point and, thus, the overall processing load in the service control point as well compared to that case wherein all messages are automatically forwarded.

According to yet another embodiment of the present invention, control information shared by a plurality of additional services controllable by the service control point is co-transmitted in the structured container message and is interpreted by the memory unit, this respectively signaling the memory unit to forward the container message to the service control point. Only a single piece of control information is thus required, this acting as filter for a plurality of additional services, all in the maximum case, and signaling the forwarding of the container message to the service control point.

Advantageously, the signaling protocol used in the communication network is employed as interface protocol for the transmission of the container message to the interface between the memory unit and the service control point. As a result thereof, only slight expansions of an existing protocol need occur for forwarding the structured container message for the control of the additional services on the basis of a subscriber self-input, this creating advantages for the interface protocol in view of outlay and testing.

According to a further embodiment of the present invention, control information for handling service data for the additional service and/or service data are co-transmitted in the structured container message and are interpreted by the service control point. Preferably, service control functions such as registration, activation/deactivation, enable or a modification of the respective additional service are implemented by the service control point dependent on the interpreted control information.

It has also proven advantageous that the service control point generates a message relating to the additional service and sends it via the interface to the memory unit that forwards the message to the communication terminal equipment. Accordingly, dialogs also can be initiated at the network side and messages having information from the service control point controlling the additional services can be transported via the memory unit to the subscriber or, respectively, to the communication terminal equipment transparently for the communication network.

A further advantageous embodiment of the present invention include of the employment in a mobile radio telephone network having at least one home register that is connected to the service control point via the interface for forwarding the container message. Preferably, a signaling protocol specific to mobile radio telephony is employed for the transmission of the container message at the interface.

The communication network according to the present invention includes a control means for receiving and interpreting at least one structured container message that is generated by the communication terminal equipment on the basis of a subscriber self-input into the communication terminal equipment carried out by the subscriber And that is sent to the memory unit. Over and above this, the communication network has an interface between the memory unit and the service control point for forwarding the container message received by the memory unit to the service control point.

The service control point according to the present invention includes a control means that receives a structured container message via an interface that connects the memory unit to the service control point and interprets control information and/or service data in the container message that is co-transmitted for service handling for the additional service and implements a service handling according to the interpreted control information.

Additional features and advantages of the present invention are described in, and will be apparent from, the Detail Description of the Preferred Embodiments and the drawings.

DETAILED DESCRIPTION OF THE PREFERRED EMBODIMENTS

Figure 1:
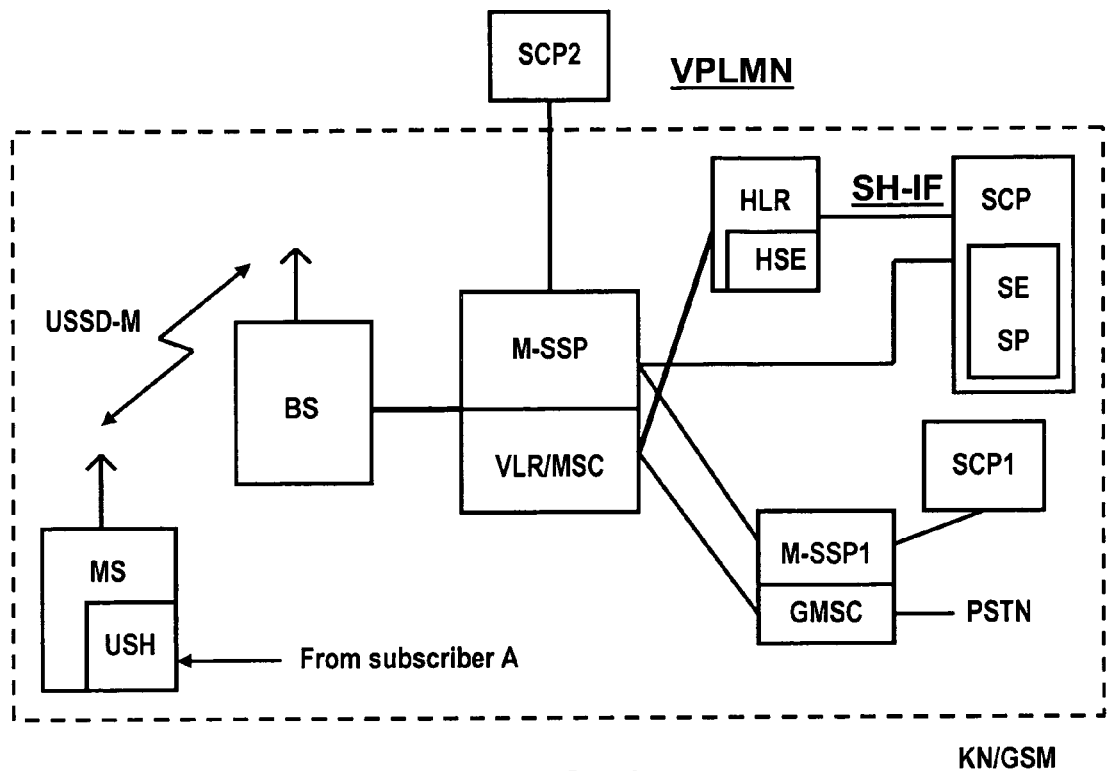
FIG. 1 shows a block circuit diagram of a mobile radio telephone network employing the inventive method for administering additional services sequences.

The communication network KN of FIG. 1 is configure, for example, as mobile radio telephone network GSM according to the standard of the same name. To that end, it includes switching equipment (the switching equipment VLR/MSC, GMSC are shown by way of example) that is connected to one another. Switching equipment VLR/MSC sets up the connection to a mobile subscriber A via a base station BS that is connected to the switching equipment VLR/MSC wire-bound, and via an air interface between base station BS and a mobile station MS. The mobile station MS is the communication terminal equipment of the mobile subscriber A.

Further switching equipment GMSC forms the network transition into a further network; for example, a fixed network PSTN. Further, the communication network KN includes service control points SCP, SCP1, SCP2 (also called CSE-CAMEL service environment according to CAMEL Phase 1) for supporting an intelligent network structure, these being respectively connected to at least one piece of switching equipment VLR/MSC, GMSC. Thus, for example, the service control point SCP is connected to the switching equipment VLR/MSC, and the service control point SCP1 is connected to the switching equipment GMSC. The service control point SCP2 lies in a different communication network VPLMN that can be interpreted as visitor mobile radio telephone network, given network-overlapping roaming of the subscriber. Given these connections, it is not necessary that each service control point SCP . . . is directly connected to each piece of switching equipment VLR/MSC . . . ; it suffices when these can be reached via a #7 signaling via the communication network KN or other networks PSTN.

According to FIG. 1, a memory unit HLR as home register of the mobile subscriber A is an independent unit that is connected with the illustrated switching equipment VLR/MSC in the present example. Further home registers can be present and behave analogous to the memory unit HLR in view of the method of the present invention. Service switching points M-SSP, M-SSP1 are placed in the switching equipment VLR/MSC, GMSC according to the intelligent network structure for the implementation of switching-oriented service functions. The switching equipment VLR/MSC of the momentary connection of the mobile subscriber A has a visitor register VLR allocated to it as temporary memory unit as long as the mobile subscriber A is located with his mobile station MS in the coverage area of this switching equipment VLR/MSC. The memory units HLR, VLR respectively contain information about GSM services that the subscriber A can use in the communication network KN.

With an NMI operation at the mobile station MS, the mobile subscriber A initiates a subscriber self-input SCI (Service Controlled Input) with which an additional service SS controllable by the service control point SCP is identified. The mobile station MS is signaled that a service control or handling for the additional service by the service control point SCP is desired in that the subscriber self-input SCI occurs on the basis of an USSD operation (Unstructured Supplementary Services Data). USSD operations relate to non-GSM-standardized services. An USSD control unit USH in the mobile station recognizes the USSD-MMI format structure, generates one or more structured container messages USSD-M and sends them via the air interface to the network; i.e., to the memory unit HLR responsible for the subscriber A.

For example, a service code for the respective service is co-transmitted in the container message USSD-M, wherein it is recognized at the memory unit HLR that an additional service to be controlled by the service control point SCP is involved. Alternatively to the individual service code, control information shared by a plurality of additional services also can be contained in the container message USSD-M. Control information or service code make it possible for the memory unit to decide whether the container message USSD-M is intended for a service registered in the memory unit HLR or for a service to be sequenced in the service control point SCP.

The memory unit HLR includes a control means HSE that receives the container message USSD-M and interprets it in view of the content. As a result of the interpretation of the control information or of the service code, it recognizes that the container message USSD-M is to be forwarded to the service control point SCP. According to the present invention, the memory unit HLR is directly connected to the service control point SCP via an interface SH-IF, so that the container message USSD-M is directly transmitted to the service control point SCP according to an interface protocol. Preferably, the mobile radio telephone-specific signaling protocol (MAP, Mobile Application Part) already employed in the mobile radio telephone network for communication of the network equipment is used as protocol and is expanded for the transmission path to the service control point SCP. The content of the container message USSD-M can thereby be completely or partially forwarded in a new message or in the existing message; for example, dependent on the service handling to be implemented and on the required control information and/or service data.

Control information for handling service data of the respective additional service and the service data themselves—for example, given modification of the service—can be co-transmitted in the container message USSD-M and can be interpreted by the service control point SCP. Examples of service control functions are registration, activation/deactivation, enable or a modification of the respective, additional service, which can be implemented by the service control point dependent on the interpreted control information.

The service control point SCP has a control means SE available to it that receives the container message USSD-M arriving via the interface SH-IF, that interprets the control information and/or service data contained therein, and implements a service handling in conformity with the interpreted control information. To that end, it also includes a memory means SP that stores all possible data and information that refers to the additional services after the service handling according to the interpreted control information.

The service control point SCP also generates one or more messages relating to the additional service and sends them in the opposite direction via the interface SH-IF to the memory unit HLR. This forwards the message to the communication terminal equipment MS. Dialogs, thus, also can be initiated at the network side and messages with information can be transported from the service control point SCP controlling the additional services directly to the memory unit HLR and, thus, can be transported to the subscriber A or, respectively, communication terminal equipment MS transparently for the communication network KN.

Figure 2:
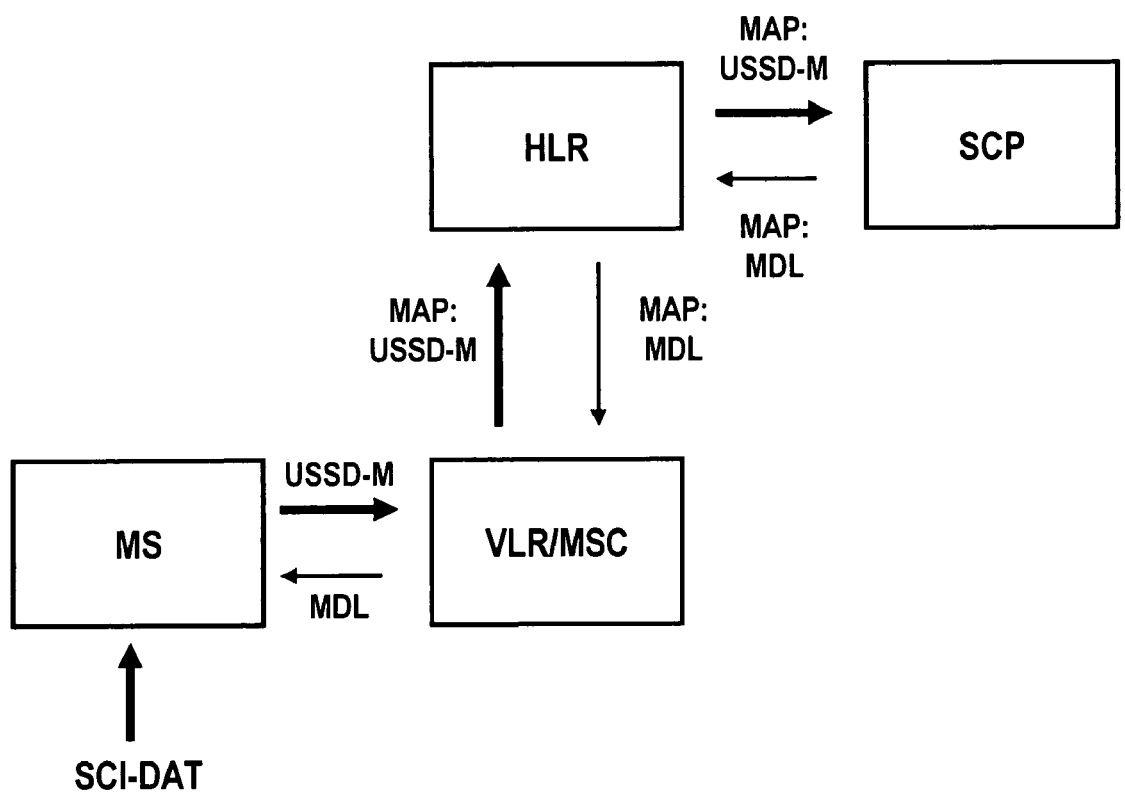
FIG. 2 shows a schematic illustration of the devices participating in the inventive method with the message flow required for the administration.

In a schematic illustration, FIG. 2 shows the message flow between the equipment used in connection with the method of the present invention, and that is required for its administration. Subscriber self-input data SCI-DAT proceeds to the mobile station MS that generates the USSD container message USSD-M—whose structure is shown by way of example in FIG. 3—and sends it to the switching equipment VLR/MSC in the network. The switching equipment VLR/MSC produces a signaling connection to the appertaining home register HLR and communicates the container message USSD-M to the home register HLR upon employment of the MAP protocol. After the interpretation of the message content and the presence of the common control information or of the service code, the forwarding of the container message USSD-M occurs directly to the service control point SCP. In the opposite direction, the service control point SCP generates at least one message MDL at the network side which is transmitted-likewise upon employment of the MAP protocol-to the home register HLR and from the latter to the switching equipment VLR/MSC currently responsible for the subscriber. The switching equipment VLR/MSC sets up a signaling connection to the mobile station via the air interface and transmits the message MDL. The mobile station MS interprets the incoming message MDL and preferably displays information to the subscriber that relates to the service controllable with the subscriber self-input. For example, the subscriber can be informed in this way of a successfully implemented activation of the service or modification of the service data by the service control point SCP.

Figure 3:
FIG. 3 shows an exemplary compilation of the structured container message on the basis of a subscriber self-input into the communication terminal equipment.
Figure 3:
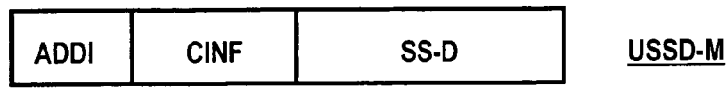

With reference to two examples, FIG. 3 shows the composition of the container message USSD-M. In the case presented above, the message contains a service code SCOD for the additional service affected by the subscriber self-input. The service code SCOD can be individually defined for every service or can be defined in common for a plurality of services or for all services. At least one sub-area TB with, for example, the codes 174 . . . 199 for the selection of the service control point SCP is reserved from a service code area CB that includes the codes 150 . . . 190 for applications in a mobile radio telephone network for the selection of the home register. The codes 150 . . . 173 remain for the services registered in the home register. In the interpretation of the container message in the home register, a comparison of the service code SCOD contained therein to the code of the sub-area TB is implemented and, given coincidence, the message is forwarded via the new interface according to the present invention. The division of the possible service code effects that all messages that are generated on the basis of a subscriber self-input are not automatically forwarded, but only the messages intended for the service handling in the service control point SCP. This procedure saves signaling outlay.

In the case shown at the bottom, the message contains common control information ADDI that is employed for a plurality of additional services or for all additional services affected by the subscribers self-input. With reference to the individual control information ADDI, which represents a separate control parameter for the service control, the home register recognizes that the message is to be forwarded. What the two examples have in common is that the control information CINF for the service handling for the identified, additional service follow the service code SCOD or, respectively, the control information CINF in the container message USSD-M. The control information CINF signals what functions related to the service are to be executed. A data field with service data SS-D can be, optionally, established in the message in order, for example, to replace existing service data with new service data or to supplement them.

Although the present invention has been described with reference to specific embodiments, those of skill in the art will recognize that changes may be made thereto without departing from the spirit and scope of the invention as set forth in the hereafter appended claims.

The invention claimed is:

1. A method for administering additional services in a communication network, the method comprising:
   providing networked switching equipment;
   providing communication terminal equipment enabling access of subscribers, the communication terminal equipment being connectable to the networked switching equipment via further devices and via which transitions to at least one further network may be effected;
   providing at least one home register connected to the communication terminal equipment that registers services of the communication network for the subscriber;
   receiving a subscriber input in the communication terminal equipment for an additional service;
   generating, via the communication terminal equipment, at least one structured container message based on the received subscriber input;

sending the at least one structured container message to the home register;

implementing an interface directly between the home register and a service control point for using additional services controllable by the service control point according to an intelligent network structure;

interpreting contents of the received at least one structured container message; and transmitting the received at least one structured container message directly to the service control point according to an interface protocol.

2. A method for administering additional services in a communication network as claimed in claim 1, further comprising the steps of:

co-transmitting a service code in the at least one structured container message;

interpreting the service code by the home register; and forwarding the at least one structured container message to the service control point dependent on a result of the interpretation.

3. A method for administering additional services in a communication network as claimed in claim 2, further comprising the steps of:

comparing the service code to service codes of a service code area with which the additional services controllable by the service control point are identified; and forwarding the at least one structured container message to the service control point given coincidence with one of the service codes of the service code area.

4. A method for administering additional services in a communication network as claimed in claim 3, further comprising the step of:

reserving at least one sub-area of the service code area used for the selection of the home register as service code for the additional services controllable by the service control point.

5. A method for administering additional services in a communication network as claimed in claim 1, further comprising the steps of:

co-transmitting a control information shared by a plurality of additional services controllable by the service control point in the at least one structured container message;

interpreting the control information by the home register; and signaling the home register to forward the container message to the service control point.

6. A method for administering additional services in a communication network as claimed in claim 1, further comprising the step of:

employing a signaling protocol used in the communication network as interface protocol for the transmission of the at least one structured container message on the interface between the home register and the service control point.

7. A method for administering additional services in a communication network as claimed in claim 1, further comprising the step of:

co-transmitting service information for service handling for the respective, additional service and service data in the at least one structured container message; and interpreting the service information by the service control point.

8. A method for administering additional services in a communication network as claimed in claim 7, further comprising the steps of:

implementing, via the service control point, at least one of a registration, an activation, a deactivation, an enable, and a modification of the respective, additional service dependent on the interpreted control information.

9. A method for administering additional services in a communication network as claimed in claim 1, further comprising the steps of:

generating a message relating to the additional service by the service control point;

sending the message relating to the additional service, via the interface, to the home register; and forwarding the message relating to the additional service to the communication terminal equipment.

10. A method for administering additional services in a communication network as claimed in claim 1, further comprising the steps of:

implementing the subscriber self-input into a mobile station by a mobile subscriber of a mobile radio telephone network;

sending the at least one structured container message from the mobile station to the home register of the mobile radio telephone network responsible for the mobile subscriber; and forwarding the at least one structured container message from the home register to the service control point via the interface.

11. A method for administering additional services in a communication network as claimed in claim 10, further comprising the step of:

employing a mobile radio telephone-specific signaling protocol for transmission of the at least one structured container message on the interface between the home register and the service control point.

12. A communication network for administering additional services, comprising:

networked switching equipment;

communication terminal equipment enabling access by subscribers, the communication terminal equipment being connectable to the networked switching equipment via further devices and via which transitions to at least one further network may be effected;

at least one memory home register connected to the communication terminal equipment that registers services of the communication network for a subscriber;

a controller in the home register for receiving and interpreting at least one structured container message that is generated by the communication terminal equipment on the basis of a subscriber self-input into the communication terminal equipment implemented by the subscriber for a respective additional service; and an interface implemented directly between the home register and a service control point, via which the received at least one structured container message, after interpretation of its contents, is transmitted directly to the service control point according to an interface protocol.

13. A service control point for controlling additional services for a communication network, wherein the communication network includes networked switching equipment, communication terminal equipment enabling access by subscribers and being connectable to the networked switching equipment via further devices and via which transitions to at least one further network may be effected, at least one home register that registers services of the communication network for a subscriber, and an interface that connects the home register directly to the service control point, the service control point comprising a control device for directly receiving at least one structured container message that is generated by the communication terminal equipment on the basis of a subscriber self-input for an additional service via the interface, the control device interpreting control information and service data in the at least one structured container message that are co-transmitted for service handling for the additional service, with the control device further implementing a service handling according to the interpreted control information.

* * * * *